(12) United States Patent
Lok et al.

(10) Patent No.: US 12,508,563 B2
(45) Date of Patent: Dec. 30, 2025

(54) PROCESSES AND APPARATUSES FOR REGENERATING A CATALYST

(71) Applicant: UOP LLC, Des Plaines, IL (US)

(72) Inventors: Ka L. Lok, Buffalo Grove, IL (US); Bryan J. Egolf, Crystal Lake, IL (US); Matthew R. Zuraski, Schaumburg, IL (US); Vikas Jaggi, Gurgaon (IN); Jennifer J. Ozmen, Wilmette, IL (US)

(73) Assignee: UOP LLC, Des Plaines, IL (US)

( * ) Notice: Subject to any disclaimer, the term of this patent is extended or adjusted under 35 U.S.C. 154(b) by 585 days.

(21) Appl. No.: 18/067,317

(22) Filed: Dec. 16, 2022

(65) Prior Publication Data
US 2023/0211306 A1 Jul. 6, 2023

Related U.S. Application Data

(60) Provisional application No. 63/266,207, filed on Dec. 30, 2021.

(51) Int. Cl.
| | |
|---|---|
| *B01J 8/26* | (2006.01) |
| *B01D 53/86* | (2006.01) |
| *B01J 8/18* | (2006.01) |
| *B01J 38/30* | (2006.01) |

(52) U.S. Cl.
CPC ............ *B01J 8/26* (2013.01); *B01D 53/8659* (2013.01); *B01D 53/8671* (2013.01); *B01J 8/1863* (2013.01); *B01J 38/30* (2013.01); *B01D 2257/20* (2013.01); *B01D 2257/80* (2013.01);
(Continued)

(58) Field of Classification Search
CPC .............. B01D 53/685; B01D 53/8659; B01D 53/8671; B01D 2257/20; B01D 2257/2045; B01D 2257/2047; B01D 2257/2064; B01D 2257/80; B01D 2258/02; B01J 8/1863; B01J 8/26; B01J 23/96; B01J 38/10; B01J 38/12; B01J 38/30; B01J 38/42;
(Continued)

(56) References Cited

U.S. PATENT DOCUMENTS

| | | |
|---|---|---|
| 5,837,636 A | 11/1998 | Sechrist et al. |
| 6,153,091 A | 11/2000 | Sechrist et al. |
| 6,881,391 B1 | 4/2005 | Sechrist |

(Continued)

FOREIGN PATENT DOCUMENTS

WO    WO-2008082899 A1 *    7/2008    .............. B01J 38/42

OTHER PUBLICATIONS

International Search Report from corresponding PCT application No. PCT/US2022/082424 mailed May 9, 2023.
(Continued)

*Primary Examiner* — Brian A McCaig

(57) ABSTRACT

Processes and apparatuses for regenerating catalysts used in a hydrocarbon conversion process. The catalyst is separated into a bypass portion and an adsorption portion. The bypass portion is passed to a regeneration zone where coke may be removed. A vent gas from the regeneration zone may include an active additive from the catalyst, like a halogen. The vent gas is sent to an adsorption zone which also receives the adsorption portion. In the adsorption zone, the catalyst will contact and adsorb the active additive and then pass to the regeneration zone. The amount of active additive in the vent gas from the regeneration zone and the adsorption zone is reduced.

20 Claims, 5 Drawing Sheets

(52) U.S. Cl.
CPC . *B01D 2258/02* (2013.01); *B01J 2208/00849* (2013.01); *B01J 2208/00991* (2013.01)

(58) Field of Classification Search
CPC .. B01J 2208/00849; B01J 2208/00991; C10G 35/12
See application file for complete search history.

(56) References Cited

U.S. PATENT DOCUMENTS

| | | |
|---|---|---|
| 8,778,823 B1 | 7/2014 | Oyekan et al. |
| 2016/0059227 A1 | 3/2016 | Lok et al. |
| 2016/0175774 A1 | 6/2016 | Sadler et al. |
| 2016/0175775 A1 | 6/2016 | Sadler et al. |
| 2019/0390117 A1 | 12/2019 | Chen et al. |

OTHER PUBLICATIONS

Written Opinion from corresponding PCT application No. PCT/US2022/082424 mailed May 9, 2023.

* cited by examiner

PROCESSES AND APPARATUSES FOR REGENERATING A CATALYST

RELATED APPLICATIONS

This application claims priority to U.S. Provisional Patent Application Ser. No. 63/266,207 filed on Dec. 30, 2021, the entirety of which is incorporated by reference.

FIELD OF THE INVENTION

This invention relates generally to regenerating catalyst, and more particularly to removing coke from catalyst.

BACKGROUND OF THE INVENTION

Numerous hydrocarbon conversion processes are used to alter the structure or properties of hydrocarbon streams. Such processes include isomerization from straight chain paraffinic or olefinic hydrocarbons to more highly branched hydrocarbons, dehydrogenation for producing olefinic or aromatic compounds, reforming to produce aromatics and motor fuels, alkylation to produce commodity chemicals and motor fuels, transalkylation, and others.

Many such processes use catalysts to promote hydrocarbon conversion reactions. These catalysts tend to deactivate for a variety of reasons, including the deposition of carbonaceous material or coke upon the catalyst, sintering or agglomeration or poisoning of catalytic metals on the catalyst, and/or loss of catalytic metal promoters such as halogens. Consequently, these catalysts are typically reactivated in a process called regeneration. Reactivation can thus include, for example, removing coke from the catalyst by burning (combustion), redispersing catalytic metals such as platinum on the catalyst, oxidizing such catalytic metals, reducing such catalytic metals, replenishing catalytic promoters such as halogens on the catalyst, and drying the catalyst.

While catalyst regeneration can be conducted in fixed catalyst beds, it is commonly carried out in a moving bed regeneration zone that is associated with a moving bed reaction zone. Fresh catalyst particles are fed to a reaction zone, which may be comprised of several reactors, and the particles flow through the zone by gravity. Catalyst is withdrawn from the bottom of the reaction zone and transported to a regeneration zone where a regeneration process consisting of one or more steps is used to regenerate the catalyst to restore its full reaction promoting ability. Catalyst flows by gravity through the various regeneration steps and then is withdrawn from the regeneration zone and furnished to the reaction zone. Movement of catalyst through the zones is often referred to as continuous though, in practice, it is semicontinuous. By semicontinuous movement is meant the repeated transfer of relatively small amounts of catalyst at closely spaced points in time. For example, one batch per minute may be withdrawn from the bottom of a regeneration zone and withdrawal may take one-half minute, that is, catalyst will flow for one-half minute. If the inventory in the regeneration zone is large, the catalyst bed may be considered to be continuously moving. A moving bed system has the advantage of maintaining production while the catalyst is removed or replaced. U.S. Pat. Nos. 5,837,636 and 6,117,809 describe moving bed regeneration zones where coke combustion, metal redispersion, metal oxidation, metal reduction, promoter addition, and catalyst drying occur.

One of the challenges during regeneration of halogen-containing catalysts is loss of halogen from the catalyst at elevated temperature and moisture level. This happens when catalyst particles are contacted with gases that, while regenerating the catalyst particles, tend also to remove halogen from the catalyst particles. Apart from any adverse effect of halogen loss on catalytic activity, venting of a gas stream containing a halogen from the process poses an environmental concern. Adsorption of the halogen on the catalyst particles is advantageous since it does not involve the expense of a separate adsorbent and its associated vessel(s) and equipment. However, it would be desirable to reduce the amount of the halogen that needs to be adsorbed.

Accordingly, there is an ongoing need and desire for more effective and efficient ways to regenerate the catalyst.

SUMMARY OF THE INVENTION

One or more apparatuses and processes have been invented which provide improved regeneration of catalyst, and more particularly to removing coke from a catalyst. In particular, it has been found that separating the spent catalyst and having a portion that bypasses the adsorption zone and passes directly to the regeneration zone provides for benefits including, for example, reduced amounts of halides and moisture in the vent gas from the adsorption zone. With reduced halides, the present invention improves the processing of the vent gas. Moreover, it has also been found that splitting the catalyst into the two portions, the amount of combustion products, like water and dioxins, contained in the vent gas from the regeneration zone and the adsorption zone are lower.

Therefore, the present invention may be characterized, in at least one aspect, as providing a process for regenerating a catalyst by: disengaging catalyst from a lift gas, the catalyst comprising coke and at least one active additive; splitting the catalyst into a bypass portion and an adsorption portion; removing coke from the catalyst of the bypass portion in a regeneration zone, the regeneration zone operated under conditions to remove coke from the catalyst and provide a regenerated catalyst and a vent gas, wherein the vent gas comprises the at least one additive; adsorbing the at least one additive from the vent gas with the catalyst from the adsorption portion in an adsorption zone; and, removing coke from the catalyst of the adsorption portion in the regeneration zone, wherein the bypass portion of the catalyst bypasses the adsorption zone.

The present invention may also be characterized, generally, as providing an apparatus for removing coke from a catalyst, the apparatus including: a disengaging zone, the disengaging zone configured to receive a mixture of catalyst and a lift gas and separate the catalyst from the lift gas, the catalyst comprising coke and at least one additive; a regeneration zone configured to receive a first portion of catalyst from the disengaging zone and wherein the regeneration zone is operated under conditions to remove coke from the catalyst and provide a regenerated catalyst and a vent gas, wherein the vent gas includes the at least one additive; and, an adsorption zone configured to receive a second portion of catalyst from the disengaging zone and wherein the adsorption zone is operated under conditions to adsorb, with the catalyst from the second portion, the at least one additive in the vent gas; wherein the first portion of the catalyst is isolated from the adsorption zone.

The present invention may also broadly be characterized as providing a process for regenerating a catalyst by: disengaging catalyst from a lift gas, the catalyst comprising coke and at least one active additive; splitting the catalyst into a first portion and a second portion; removing coke from the catalyst of the first portion in a regeneration zone, the regeneration zone operated under conditions to remove coke from the catalyst and provide a regenerated catalyst and a vent gas, wherein the vent gas comprises the at least one additive; adsorbing the at least one additive from the vent gas with the catalyst from the second portion in an adsorption zone, wherein the adsorption zone produces an adsorption zone vent gas; removing coke from the catalyst of the second portion in the regeneration zone; and, separating, in a separation zone, the adsorption zone vent gas into a water stream and a recycle gas stream, the recycle gas stream being passed to the regeneration zone.

Additional aspects, embodiments, and details of the invention, all of which may be combinable in any manner, are set forth in the following detailed description of the invention.

DETAILED DESCRIPTION OF THE DRAWINGS

One or more exemplary embodiments of the present invention will be described below in conjunction with the following drawing figures, in which.

DETAILED DESCRIPTION OF THE INVENTION

The present invention is believed to be applicable to a wide range of catalytic hydrocarbon conversion processes and the regeneration of their catalysts, including aromatic isomerization, paraffin or olefin isomerization, paraffin dehydrogenation, and alkylation. Such catalysts typically contain an active additive, such as a halogen, including for example, chlorine or fluorine. However, catalytic reforming is the most widely practiced hydrocarbon conversion process that uses catalyst regeneration and to which the method disclosed herein applies.

Accordingly, the present invention is particularly applicable to moving-bed regeneration zones, which may be associated with fixed- or moving-bed reaction zones. The regeneration zone can be any regeneration zone that produces a halogen-containing vent gas that can be routed to the adsorption zone. Suitable regeneration zones include zones for coke combustion, dispersion, halogenating, oxidation, drying, and reduction. These zones are well known to persons of ordinary skill in the art and need not be described herein in detail.

With these general principles in mind, one or more embodiments of the present invention will be described with the understanding that the following description is not intended to be limiting.

Figure 1:
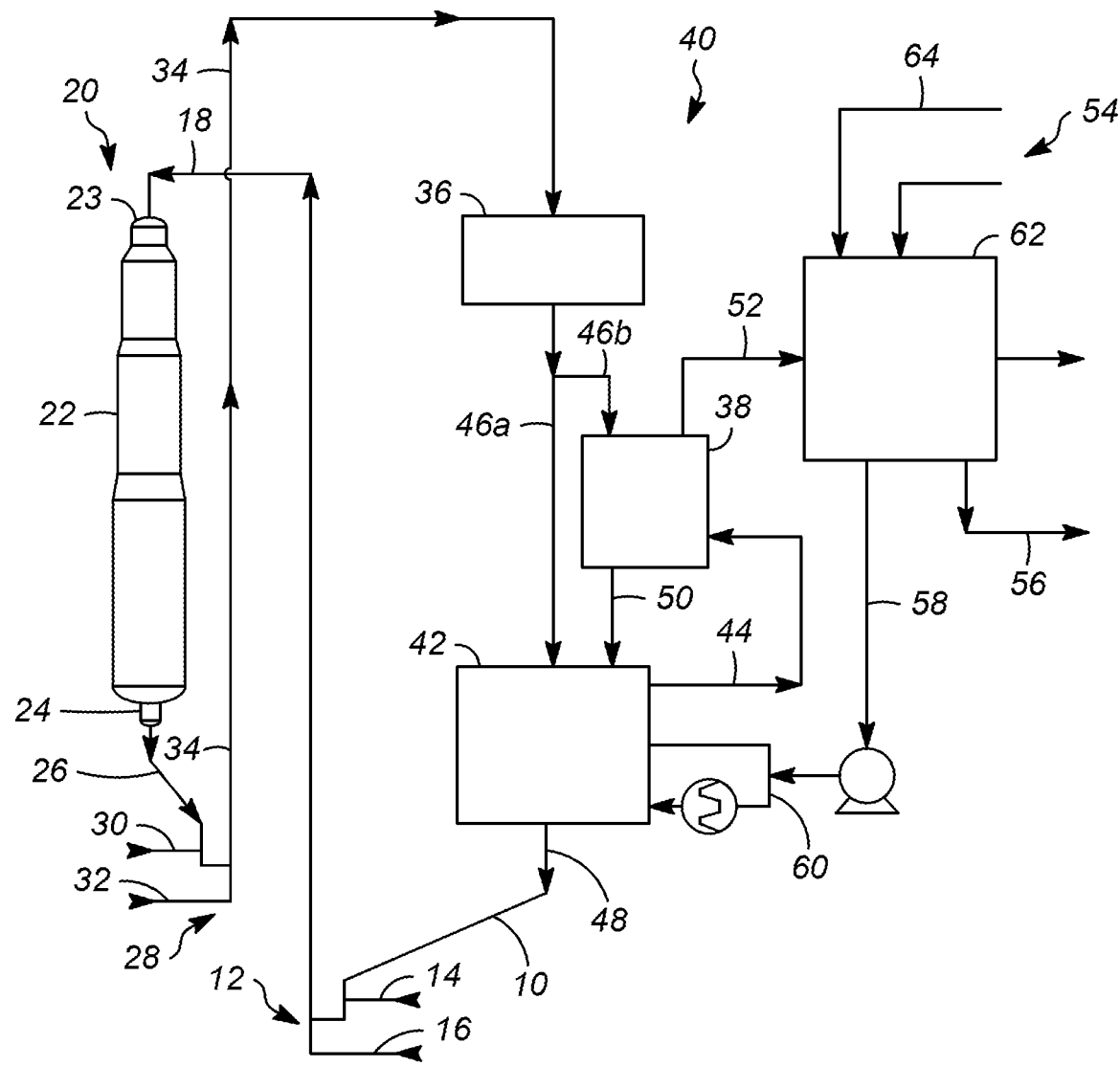
FIG. 1 is a schematic diagram of a reactor and regenerator used in accordance with one of more embodiments of the present invention.

With reference to FIG. 1, catalyst, in a line 10, containing an oxidized metal and an active additive are provided to a nonmechanical valve 12. A gas, in particular a hydrogen containing gas, enters the valve 12 through line 14 at a rate that regulates the transfer of catalyst particles through valve 12 into line 18. Valve 12 can take on well-known forms such as an L valve, J valve, or K valve. Further information on nonmechanical valves can be found in U.S. Pat. No. 5,837,636 and the references incorporated therein. As catalyst particles enter line 18, more gas enters the bottom of line 18 through line 16 and transports the catalyst particles upwardly through the line 18 to a reaction zone 20 containing a stacked reactor arrangement 22, which the particles and lift gas enter.

Catalyst particles flow from the top to the bottom of the stacked reactor arrangement 22. At the top, the catalyst particles pass first through a reduction zone, where hydrogen gas reduces the metal on the catalyst particles. From there the catalyst particles pass through multiple reactors where hydrocarbons contact the catalyst particles and coke is deposited on the catalyst particles. Details of the individual reactors and other internals of the stacked reactor arrangement 22 are well known. The stacked reactor arrangement 22 permits continuous or intermittent flow of the catalyst particles from the top 23 to lower retention chamber 24 at the bottom. Additional hydrogen enters chamber 24 through a line (not shown) at a rate that purges hydrocarbons from the catalyst particles in chamber 24.

Catalyst particles containing coke deposits flow from chamber 24 and through line 26. In line 26, hydrogen and hydrocarbons are displaced from the catalyst particles to prevent any carry-over of hydrogen and hydrocarbons to regenerator 40. At the bottom of line 26, nonmechanical valve 28 transfers catalyst particles upwardly through line 34. A lift gas, such as nitrogen, enters the valve 28 through a line 30. Additional lift gas may enter through another line 32.

The lift gas carries the catalyst particles to a disengage or disengaging zone 36. In the disengaging zone 36, catalyst particles are separated the lift gas. Additional gas may be added to the disengaging zone 36. Again, the catalyst particles transferred to the disengaging zone 36 include coke and at least one active additive, like a halide.

In conventional processes and apparatuses all of the catalyst particles from the disengaging zone 36 are typically passed first to an adsorption zone 38 and then to a regeneration zone 42 to remove coke. The regeneration zone 42 generates a vent gas 44 containing the at least one additive and moisture. The vent gas 44 is cooled to a range of temperature between 30° C. to 350° C., preferably between 50 to 180° C., prior to the gas entering the adsorption zone. The uptake capacity of halides in the adsorption zone 38 is favored by lower catalyst bed temperature. The rejection of moisture from the adsorption zone 38 is favored by higher portions of bypass catalyst. Cooling methods of regeneration vent gas is well known. The cooled regeneration vent gas stream is passed to the adsorption zone 38 where catalyst passing therethrough adsorb the at least one additive on the way to the regeneration zone 42. However, it has been surprisingly found that the catalyst particles can be regenerated to suitable levels if less than all of the catalyst particles are passed to the adsorption zone 38. Accordingly, in the present processes, the catalyst particles from the disengaging zone 36 are separated into two portions, a bypass portion 46a and an adsorption portion 46b. The ratio of the bypass portion 46a to the adsorption portion 46b may range between 99:1 to 1:99.

The bypass portion 46a of catalyst is passed directly to the regeneration zone 42 of the regenerator 40. In other words, the bypass portion 46a of catalyst does not contact the vent gas 44 from the regeneration zone 42 in the adsorption zone 38.

With part of catalyst bypassed directly to regeneration zone 42 and the other fraction going through the adsorption zone 38, it has been observed that the temperature of the adsorption bed is governed by high thermal mass of vent gas and exotherm of heat adsorption is better managed. In a bypass scenario, normally the bed temperature should be within 5 to 50° C. of the vent gas inlet temperature but more preferably under 20° C.

Catalyst adsorption capacity of halogen species and moisture is also a function of surface area, and experiments were conducted to capture the effect of catalyst surface area on the competitive adsorption of gaseous species. Reaction chemistries can also be influenced by surface area, and examples such as naphtha reforming experience faster deactivation from coke laydown when catalysts have high surface areas. Catalyst with optimal surface area provides sufficient halide absorption without excessive influence on the desired process chemistry. It has been found that the adsorption zone 38 is able to remove desired amount of halogen species if the catalyst surface area is between 80-220 $m^2/g$, however it is preferred to operate within the range of 110-180 $m^2/g$.

The regeneration zone 42 is operated under conditions to remove coke from the catalyst particles and provide a regenerated catalyst 48 and the vent gas 44. Conditions for the regeneration zone are known. From the regeneration zone 42, the regenerated catalyst 48 may be passed back to the stacked reactor 22 via line 10 as discussed above.

As noted above, the vent gas 44 from the regeneration zone 42 includes the at least one additive and may also include, water, dioxins, and other components. Accordingly, the vent gas 44 from the regeneration zone 42 is passed to the adsorption zone 38 of the regenerator 40 which also receives the adsorption portion 46b of the catalyst from the disengaging zone 36. In the adsorption zone 38, the active additive and moisture is removed from the vent gas 44 by being contacted with the catalyst from the adsorption portion 46b. From the adsorption zone 38, catalyst, in line 50, may be passed to the regeneration zone 42 to remove coke from the catalyst particles.

Accordingly, in the present invention, the bypass portion 46a of the catalyst bypasses the adsorption zone 38 during any given regeneration cycle. By separating the catalyst and having a portion bypass the adsorption zone 38, the amount of active additive in an adsorption zone vent gas 52 is reduced, as well as the amount of combustion products contained therein. This reduction, therefore, allows for a more efficient processing of the adsorption zone vent gas 52.

For example, the adsorption zone vent gas 52 may be passed to a separation zone 54 to be separated into a water stream 56 and a recycle gas stream 58. The recycle gas stream 58 may be passed to the regeneration zone 42, for example by being combined with a regeneration gas loop 60.

The separation zone 54 may be a moisture extractor 62 that receives a refinery cooling water 64. As is known refinery cooling water 64 refers to water typically present in a chemical processing plant or refinery which may have a pressure between atmospheric up to 7 $kg/cm^2(g)$ (100 psid) and a temperature between 10 to 70° C., or 10 to 60° C., or 10 to 60° C. Since the level of combustion products in the adsorption zone vent gas 52 is low, the moisture extractor 62 is an efficient and effective separation unit.

Figure 2:
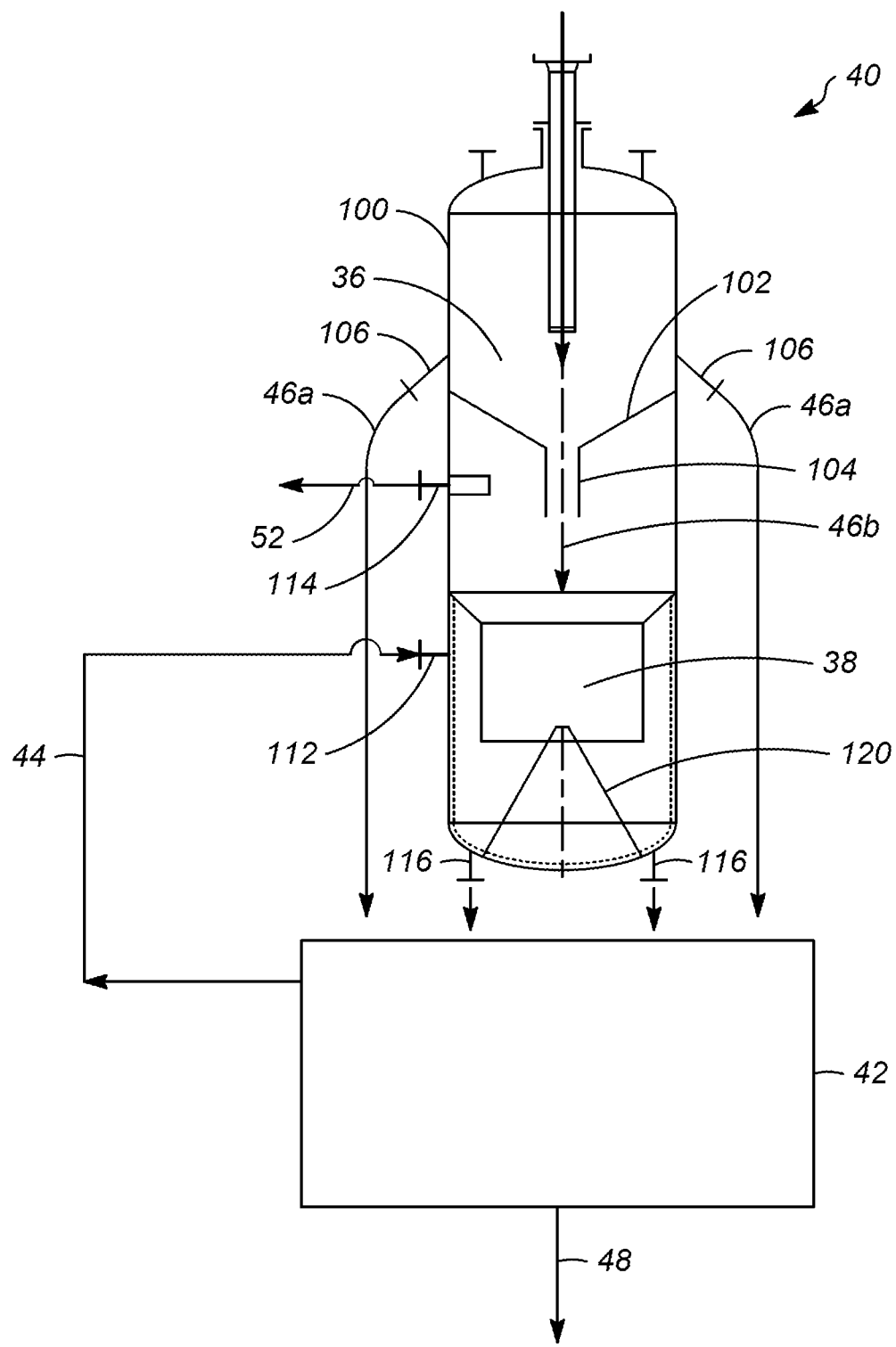
FIG. 2 is a schematic diagram of a vessel used in a regenerator according to one of more embodiments of the present invention.
Figure 3:
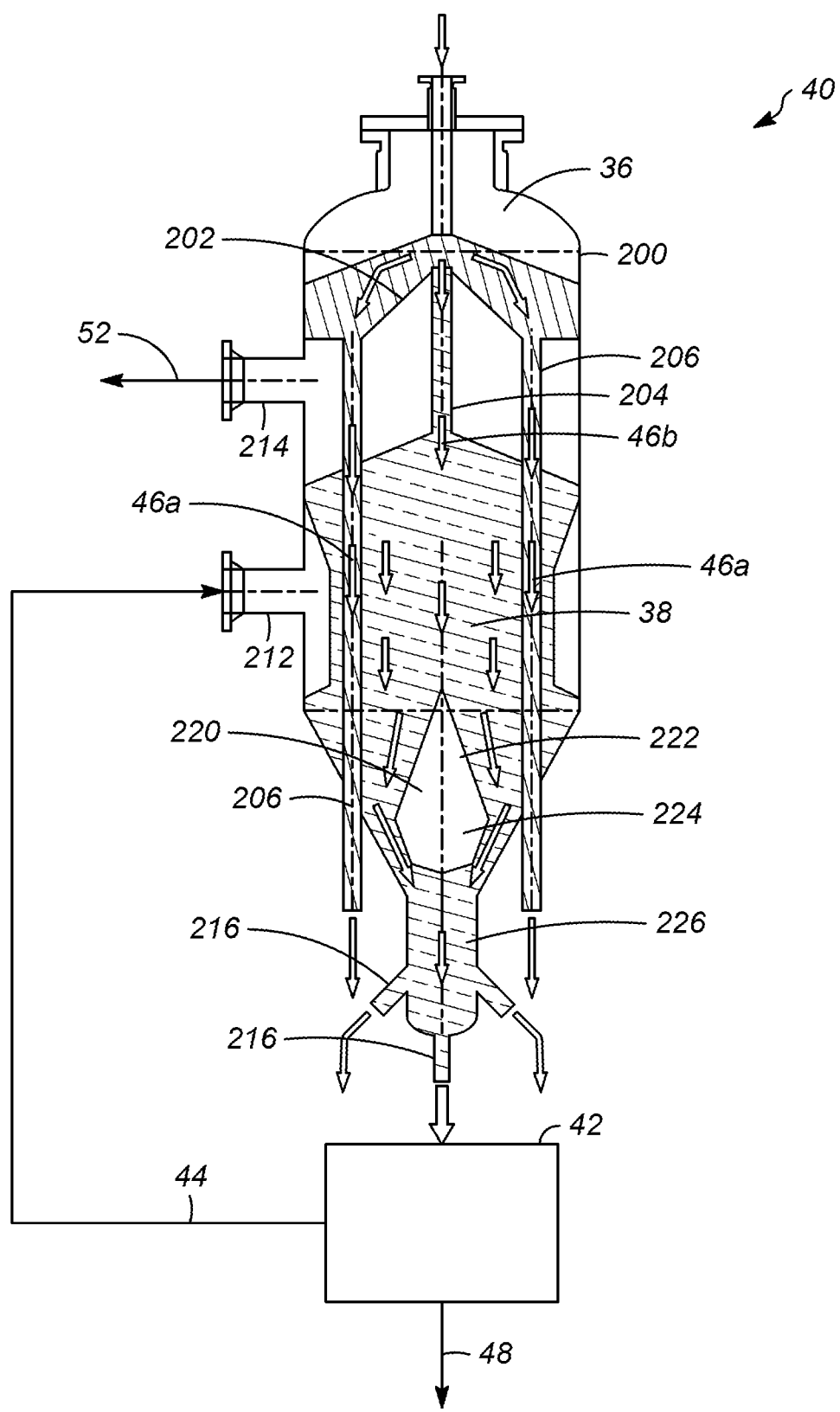
FIG. 3 is a schematic diagram of a vessel used in a regenerator according to one of more embodiments of the present invention.
Figure 4:
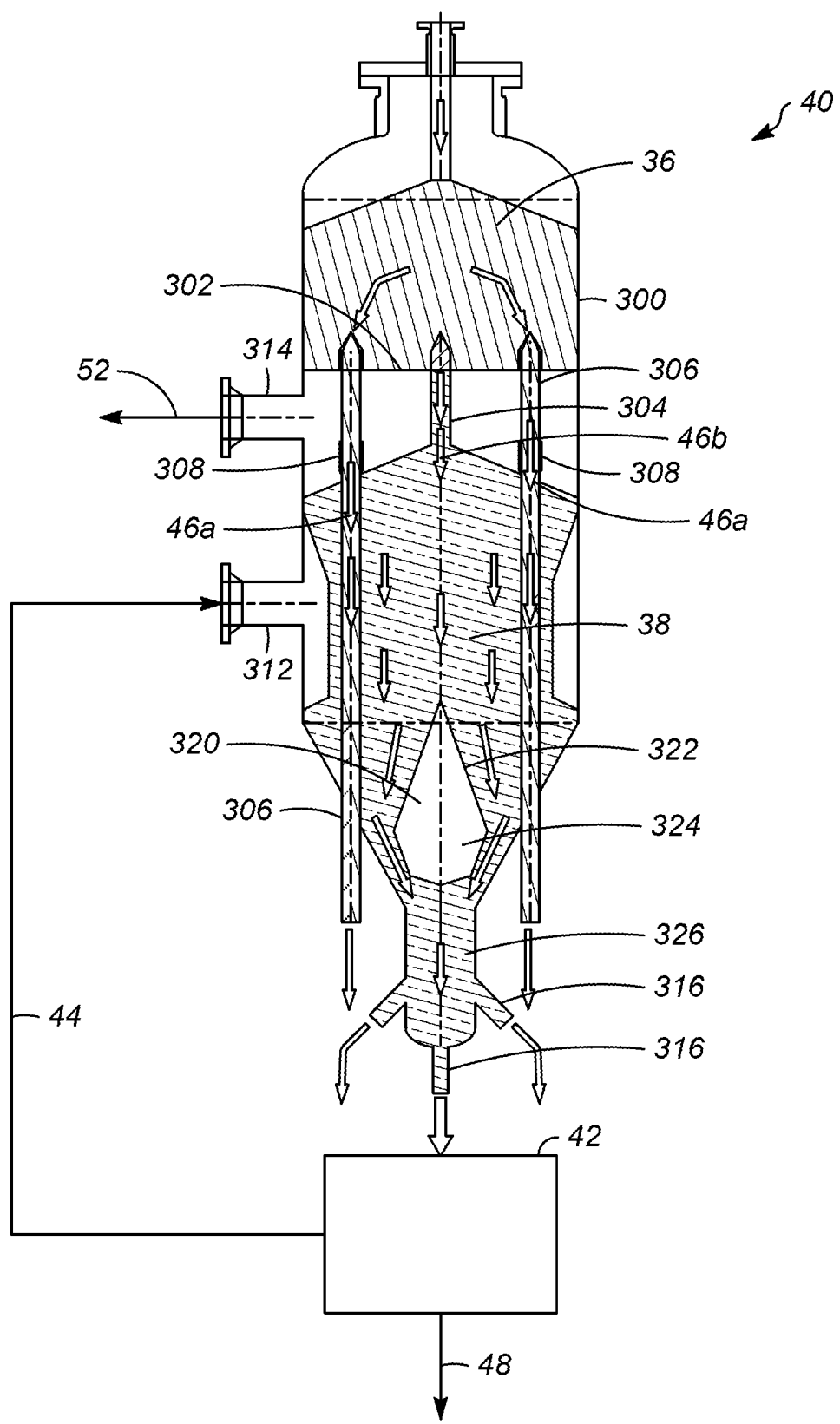
FIG. 4 is a schematic diagram of a vessel used in a regenerator according to one of more embodiments of the present invention.

Turning to FIGS. 2 to 4, various example vessels 100, 200, 300 are shown which may be used in accordance with one or more aspects of the present invention, and in particular may be used in the regenerator 40. Each of the depicted vessels 100, 200, 300 contains a baffle 102, 202, 302 which separates the disengaging zone 36 from the adsorption zone 38.

In the vessel 100 shown in FIG. 2, the baffle 102 has a downward concave shape (i.e., a cone shape with an apex at the bottom). As shown in the vessel 200 of FIG. 3, the baffle 202 may have an upward concave shape (i.e., a cone shape with an apex at the top). Finally, as shown in the vessel 300 of FIG. 4, the baffle 302 may have a planar shape. Any of the baffles 102, 202, 302 are suitable to facilitate the catalyst particles being separated into the two portions 46a, 46b; however, the baffle 202 with the upward concave shape, from FIG. 3, is believed to reduce the amount of catalyst circulating in the system.

Additionally, in each of the depicted vessels 100, 200, 300, catalyst transfer pipes are used to transfer the two portions 46a, 46b of the catalyst to the regeneration zone 42 and the adsorption zone 38, respectively.

In FIG. 2, one or more first catalyst transfer pipes 104 transfers the adsorption portion 46b from the disengaging zone 36 to the adsorption zone 38. Additionally, one or more second catalyst transfer pipes 106 transfer the bypass portion 46a from the disengaging zone 36 to the regeneration zone 42, thereby bypassing the adsorption zone 38. In the vessel 100 of FIG. 2, the second catalyst transfer pipes 106 for the bypass portion 46a are external to the vessel 100.

In FIGS. 3 and 4, the vessels 200, 300 also include first catalyst transfer pipes 204, 304 for the for transferring the adsorption portion 46b from the disengaging zone 36 to the adsorption zone 38. With respect to the second catalyst transfer pipes 206, 306 for the bypass portion 46a, in these vessels 200, 300 those catalyst transfer pipes 206, 306 are internal to vessels 200, 300. Thus, while the catalyst transfer pipes 206, 306 physically pass through the adsorption zone 38, the catalyst particles in the bypass portion 46a are prohibited from contacting the vent gas 44 from the regeneration zone 42 that is passed to the adsorption zone 38.

In configurations in which the second catalyst transfer pipes 206, 306 for the bypass portion 46a are internal to the vessels 200, 300, it is contemplated that a portion of a seal gas is released into the vessels 200, 300, however it is also possible that none of the seal gas is released into the vessels (i.e., the second catalyst transfer pipes 206, 306 are solid and continuous throughout the entire vessel). The seal gas may be the lift gas 30, 32 that carries the catalyst to the regenerator 40.

Figure 5A:
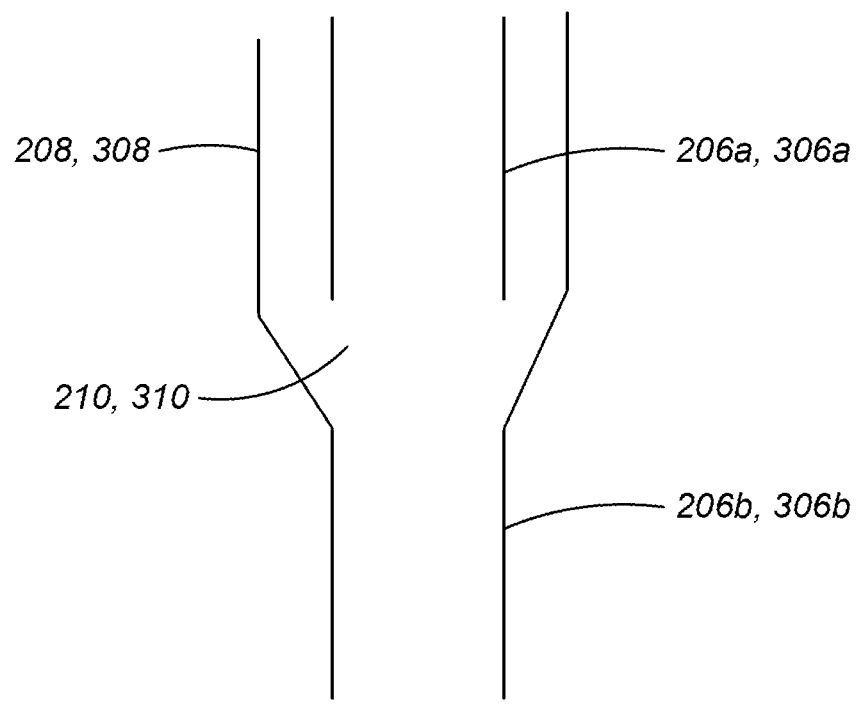
FIG. 5A is a schematic diagram of a shroud used in a catalyst transfer pipe in a regenerator according to one of more embodiments of the present invention; and, FIG. 5B is a schematic diagram of a shroud used in a catalyst transfer pipe in a regenerator according to one of more embodiments of the present invention.
Figure 5B:
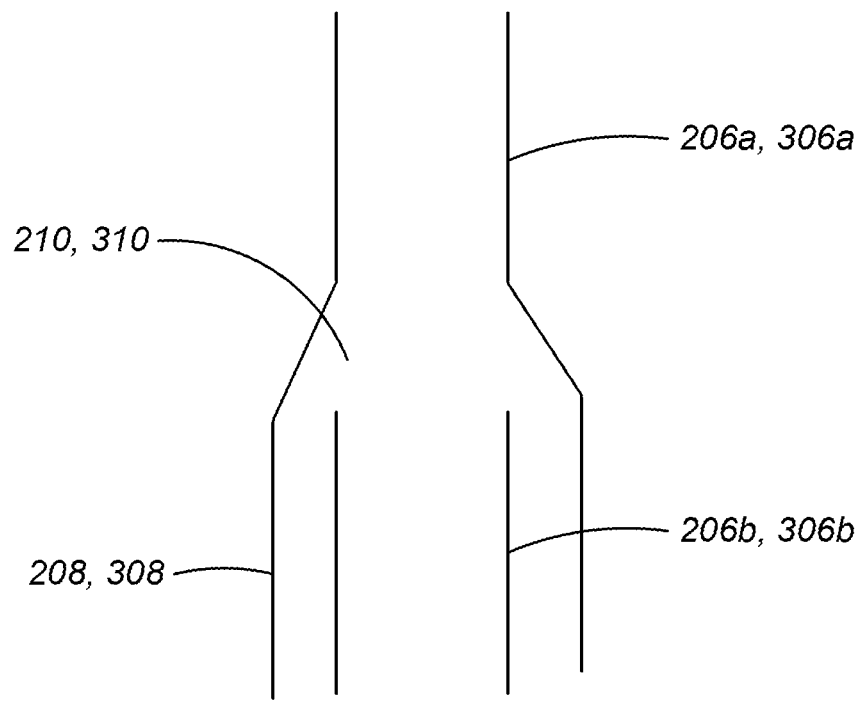

In order to isolate the catalyst of the bypass portion 46a from the vent gas 44 in the adsorption zone 38, the second catalyst transfer pipes 206, 306 for the bypass portions 46a may include a shroud 208, 308. As shown in more detail in FIGS. 5A and 5B, the second catalyst transfer pipes 206, 306 include upper portions 206a, 306a and lower portions 206b, 306b that are separated by a gap 210, 310. The upper and lower portions 206a, 206b, 306a, 306b are preferably concentric.

The shroud 208, 308 is a portion of one of the upper or lower portions 206a, 206b, 306a, 306b that increases in diameter and surrounds the other portion. This will allow the seal gas to vent from the second catalyst transfer pipes 206, 306 for the bypass portion 46a but still isolate the catalyst of the bypass portion from the vent gas 44 in the adsorption zone 38. However, this is merely one configuration and it is contemplate that the second catalyst transfer pipes 206, 306 are solid—meaning no gaps are provided.

As is shown in FIGS. 2 to 4, the vessels 100, 200, 300 each have an inlet 112, 212, 312 for the vent gas 44 from the regeneration zone 42, and an outlet 114, 214, 314 for the adsorption zone vent gas 52. Within the adsorption zone 38, catalyst particles from the adsorption portion 46b will contact the active additive in the vent gas 44 and adsorb it. After adsorbing the active additive, the catalyst particles will fall to the bottom of the vessels 100, 200, 300 where one or more third catalyst transfer pipes 116, 216, 316 will allow for the catalyst to be passed to the regeneration zone 42 from the adsorption zone 38.

A second baffle 120, 220, 320, such as a catalyst flow cone, is located proximate to the bottom of the vessels 100, 200, 300 is below the adsorption zone 38 to enable catalyst uniform distribution plug flow through the adsorption bed 38. This allows good catalyst contact with the regeneration vent gas stream 44 inside the adsorption 38. In the vessel of FIG. 2, the second baffle 120 has an upward concave shape. As shown in vessels of FIGS. 3 and 4, the second baffles 220, 320 have an upper portion 222, 322 that has an upward concave cone and a lower portion 224, 324 that has a downward concave cone. Additionally, in the vessels 200, 300 of FIGS. 3 and 4, a boot 226, 326 is provided below the for collecting and distributing the catalyst to the third catalyst transfer pipes 116, 216, 316. The boot 226, 326 is located below the second baffles 120, 220, 320 so as to re-distributed the catalyst from the adsorption bed 36 to the catalyst transfer pipes 216, 316.

Any of these depicted vessels are believed to allow for the catalyst from the disengaging zone 36 to be separated into two portions 46a, 46b—one which is passed first to the adsorption zone 38 and then to the regeneration zone 42 and one which is passed directly to the regeneration zone 42. This reduces the amount of active material, as well as combustion products, passed between the two zones and allows for better control and regeneration of the catalyst.

EXPERIMENTS

A kinetic modeling was performed and the results of the kinetic modeling are shown in TABLE 1, below.

TABLE 1

| Bypass portion (%) | Active Additive in Adsorption Zone Vent Gas (Cl, in a volume/molar basis, ppmv) | Active Additive in Regeneration Zone Vent Gas (Cl, in a volume/molar basis, ppmv) | Active Additive on Catalyst leaving adsorption zone (wt %) |
|---|---|---|---|
| 0 | 1507 | 11 | 0.98 |
| 30 | 1179 | 11 | 0.99 |
| 60 | 883 | 8 | 1.02 |
| 85 | 589 | 3 | 1.16 |

Accordingly, by separating the catalyst and only passing a portion of the catalyst to the adsorption zone, the amount of active additive in the vent gases is reduced.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

SPECIFIC EMBODIMENTS

While the following is described in conjunction with specific embodiments, it will be understood that this description is intended to illustrate and not limit the scope of the preceding description and the appended claims.

A first embodiment of the invention is a process for regenerating a catalyst, the process comprising disengaging catalyst from a lift gas, the catalyst comprising coke and at least one active additive; splitting the catalyst into a bypass portion and an adsorption portion; removing coke from the catalyst of the bypass portion in a regeneration zone, the regeneration zone operated under conditions to remove coke from the catalyst and provide a regenerated catalyst and a vent gas, wherein the vent gas comprises the at least one additive; adsorbing the at least one additive from the vent gas with the catalyst from the adsorption portion in an adsorption zone; and, removing coke from the catalyst of the adsorption portion in the regeneration zone, wherein the bypass portion of the catalyst bypasses the adsorption zone. An embodiment of the invention is one, any or all of prior embodiments in this paragraph up through the first embodiment in this paragraph, wherein one or more catalyst transfer pipes are used for the bypass portion. An embodiment of the invention is one, any or all of prior embodiments in this paragraph up through the first embodiment in this paragraph, wherein the one or more catalyst pipes bypass the adsorption zone. An embodiment of the invention is one, any or all of prior embodiments in this paragraph up through the first embodiment in this paragraph, wherein the one or more catalyst transfer pipes for the bypass portion pass through the adsorption zone. An embodiment of the invention is one, any or all of prior embodiments in this paragraph up through the first embodiment in this paragraph, further comprising releasing a portion of a seal gas from the one or more catalyst transfer pipes into the adsorption zone while isolating the catalyst of the bypass portion from the vent gas into the adsorption zone. An embodiment of the invention is one, any or all of prior embodiments in this paragraph up through the first embodiment in this paragraph, wherein the adsorption zone produces an adsorption zone vent gas and wherein the process further comprises separating, in a separation zone, the adsorption zone vent gas into a water stream and a recycle gas stream, the recycle gas stream being passed to the regeneration zone. An embodiment of the invention is one, any or all of prior embodiments in this paragraph up through the first embodiment in this paragraph, wherein the separation zone comprises a moisture extractor that receives a refinery cooling water.

A second embodiment of the invention is an apparatus for removing coke from a catalyst, the apparatus comprising a disengaging zone, the disengaging zone configured to receive a mixture of catalyst and a lift gas and separate the catalyst from the lift gas, the catalyst comprising coke and at least one additive; a regeneration zone configured to receive a first portion of catalyst from the disengaging zone and wherein the regeneration zone is operated under conditions to remove coke from the catalyst and provide a regenerated catalyst and a vent gas, wherein the vent gas comprises the at least one additive; and, an adsorption zone configured to receive a second portion of catalyst from the disengaging zone and wherein the adsorption zone is operated under conditions to adsorb, with the catalyst from the second portion, the at least one additive in the vent gas; wherein the first portion of the catalyst is isolated from the adsorption zone. An embodiment of the invention is one, any or all of prior embodiments in this paragraph up through the second embodiment in this paragraph, further comprising at least one catalyst transfer pipe configured to isolate the first portion of catalyst from the adsorption zone. An embodiment of the invention is one, any or all of prior embodiments in this paragraph up through the second embodiment in this paragraph, wherein the disengaging zone and the adsorption zone are contained in a vessel, and wherein the at least one catalyst transfer pipe is external to the vessel. An embodiment of the invention is one, any or all of prior embodiments in this paragraph up through the second embodiment in this paragraph, wherein the disengaging zone and the adsorption zone are contained in a vessel, and wherein the at least one catalyst transfer pipe is internal to the vessel. An embodiment of the invention is one, any or all of prior embodiments in this paragraph up through the second embodiment in this paragraph, wherein the at least one catalyst transfer pipe comprises a vent opening. An embodiment of the invention is one, any or all of prior embodiments in this paragraph up through the second embodiment in this paragraph, wherein the vent opening comprises a shroud over a concentric pipe. An embodiment of the invention is one, any or all of prior embodiments in this paragraph up through the second embodiment in this paragraph, further comprising a catalyst transfer pipe configured to receive the second portion of the catalyst. An embodiment of the invention is one, any or all of prior embodiments in this paragraph up through the second embodiment in this paragraph, wherein the disengaging zone and the adsorption zone are contained in a vessel, and wherein the vessel further comprises a baffle configured to redistribute catalyst to one or more catalyst transfer pipes. An embodiment of the invention is one, any or all of prior embodiments in this paragraph up through the second embodiment in this paragraph, wherein the baffle comprises a downward concave cone. An embodiment of the invention is one, any or all of prior embodiments in this paragraph up through the second embodiment in this paragraph, wherein the downward concave cone comprises an upper portion of the baffle, and wherein a lower portion of the baffle comprises an upward concave cone. An embodiment of the invention is one, any or all of prior embodiments in this paragraph up through the second embodiment in this paragraph, the baffle is disposed above a boot, the boot comprising the one or more catalyst transfer pipes.

A third embodiment of the invention is a process for regenerating a catalyst, the process comprising disengaging catalyst from a lift gas, the catalyst comprising coke and at least one active additive; splitting the catalyst into a first portion and a second portion; removing coke from the catalyst of the first portion in a regeneration zone, the regeneration zone operated under conditions to remove coke from the catalyst and provide a regenerated catalyst and a vent gas, wherein the vent gas comprises the at least one additive; adsorbing the at least one additive from the vent gas with the catalyst from the second portion in an adsorption zone, wherein the adsorption zone produces an adsorption zone vent gas; removing coke from the catalyst of the second portion in the regeneration zone; and, separating, in a separation zone, the adsorption zone vent gas into a water stream and a recycle gas stream, the recycle gas stream being passed to the regeneration zone. An embodiment of the invention is one, any or all of prior embodiments in this paragraph up through the third embodiment in this paragraph, wherein the separation zone comprises a moisture extractor that receives a refinery cooling water.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for regenerating a catalyst, the process comprising:
   disengaging catalyst from a lift gas, the catalyst comprising coke and at least one active additive;

splitting the catalyst into a bypass portion and an adsorption portion;

removing coke from the catalyst of the bypass portion in a regeneration zone, the regeneration zone operated under conditions to remove coke from the catalyst and provide a regenerated catalyst and a vent gas, wherein the vent gas comprises the at least one active additive;

adsorbing the at least one active additive from the vent gas with the catalyst from the adsorption portion in an adsorption zone; and, removing coke from the catalyst of the adsorption portion in the regeneration zone, wherein the bypass portion of the catalyst bypasses the adsorption zone.

2. The process of claim 1, wherein one or more catalyst transfer pipes are used for the bypass portion.

3. The process of claim 2, wherein the one or more catalyst pipes bypass the adsorption zone.

4. The process of claim 3, wherein the one or more catalyst transfer pipes for the bypass portion pass through the adsorption zone.

5. The process of claim 4, further comprising:
releasing a portion of a seal gas from the one or more catalyst transfer pipes into the adsorption zone while isolating the catalyst of the bypass portion from the vent gas into the adsorption zone.

6. The process of claim 1, wherein the adsorption zone produces an adsorption zone vent gas and wherein the process further comprises:
separating, in a separation zone, the adsorption zone vent gas into a water stream and a recycle gas stream, the recycle gas stream being passed to the regeneration zone.

7. The process of claim 6, wherein the separation zone comprises a moisture extractor that receives a refinery cooling water.

8. An apparatus for removing coke from a catalyst, the apparatus comprising:
a disengaging zone, the disengaging zone configured to receive a mixture of catalyst and a lift gas and separate the catalyst from the lift gas, the catalyst comprising coke and at least one additive;
a regeneration zone configured to receive a first portion of catalyst from the disengaging zone and wherein the regeneration zone is operated under conditions to remove coke from the catalyst and provide a regenerated catalyst and a vent gas, wherein the vent gas comprises the at least one additive; and,
an adsorption zone configured to receive a second portion of catalyst from the disengaging zone and wherein the adsorption zone is operated under conditions to adsorb, with the catalyst from the second portion, the at least one additive in the vent gas;
wherein the first portion of the catalyst is isolated from the adsorption zone.

9. The apparatus of claim 8, further comprising:
at least one catalyst transfer pipe configured to isolate the first portion of catalyst from the adsorption zone.

10. The apparatus of claim 9, wherein the disengaging zone and the adsorption zone are contained in a vessel, and wherein the at least one catalyst transfer pipe is external to the vessel.

11. The apparatus of claim 9, wherein the disengaging zone and the adsorption zone are contained in a vessel, and wherein the at least one catalyst transfer pipe is internal to the vessel.

12. The apparatus of claim 9, wherein the at least one catalyst transfer pipe comprises a vent opening.

13. The apparatus of claim 12, wherein the vent opening comprises a shroud over a concentric pipe.

14. The apparatus of claim 8, further comprising a catalyst transfer pipe configured to receive the second portion of the catalyst.

15. The apparatus of claim 8, wherein the disengaging zone and the adsorption zone are contained in a vessel, and wherein the vessel further comprises a baffle configured to redistribute catalyst to one or more catalyst transfer pipes.

16. The apparatus of claim 15, wherein the baffle comprises a downward concave cone.

17. The apparatus of claim 16, wherein the downward concave cone comprises an upper portion of the baffle, and wherein a lower portion of the baffle comprises an upward concave cone.

18. The apparatus of claim 16, the baffle is disposed above a boot, the boot comprising the one or more catalyst transfer pipes.

19. A process for regenerating a catalyst, the process comprising:
disengaging catalyst from a lift gas, the catalyst comprising coke and at least one active additive;
splitting the catalyst into a first portion and a second portion;
removing coke from the catalyst of the first portion in a regeneration zone, the regeneration zone operated under conditions to remove coke from the catalyst and provide a regenerated catalyst and a vent gas, wherein the vent gas comprises the at least one active additive;
adsorbing the at least one active additive from the vent gas with the catalyst from the second portion in an adsorption zone, wherein the adsorption zone produces an adsorption zone vent gas;
removing coke from the catalyst of the second portion in the regeneration zone; and,
separating, in a separation zone, the adsorption zone vent gas into a water stream and a recycle gas stream, the recycle gas stream being passed to the regeneration zone.

20. The process of claim 19, wherein the separation zone comprises a moisture extractor that receives a refinery cooling water.

* * * * *